H. H. CUMMINGS.
NAVIGATOR'S SPEED INDICATOR SHIP'S LOGS.
APPLICATION FILED MAR. 16, 1910.

1,083,597.

Patented Jan. 6, 1914.

H. H. CUMMINGS.
NAVIGATOR'S SPEED INDICATOR SHIP'S LOGS.
APPLICATION FILED MAR. 16, 1910.

1,083,597.

Patented Jan. 6, 1914.

Witnesses:
Arthur F. Randall
L. B. Weymouth

Inventor:
Henry H. Cummings,
by Geo. S. Maxwell
Atty.

H. H. CUMMINGS.
NAVIGATOR'S SPEED INDICATOR SHIP'S LOGS.
APPLICATION FILED MAR. 16, 1910.

1,083,597.

Patented Jan. 6, 1914.

UNITED STATES PATENT OFFICE.

HENRY H. CUMMINGS, OF NEWTON HIGHLANDS, MASSACHUSETTS.

NAVIGATOR'S SPEED-INDICATOR SHIP'S LOGS.

1,083,597.  Specification of Letters Patent.  Patented Jan. 6, 1914.

Application filed March 16, 1910. Serial No. 549,609.

*To all whom it may concern:*

Be it known that I, HENRY H. CUMMINGS, a citizen of the United States, and resident of Newton Highlands, in the county of Middlesex and State of Massachusetts, have invented an Improvement in Navigators' Speed-Indicator Ships' Logs, of which the following description, in connection with the accompanying drawings, is a specification, like letters on the drawings representing like parts.

My invention has for its object the simplification and improvement of the means and method of determining the speed of a vessel, whereby the chart-room work is greatly simplified, my mechanism affording means for accurately taking into account the well recognized modifying circumstances, such, for instance, as the current, draft of the vessel, revolutions of the port engine and starboard engine, slip of the screw, condition of the bottom of the vessel, wind, etc.

The constructional details of my invention and manner of use thereof will be pointed out more at length in the course of the following description, taken in connection with the accompanying drawings, which present a preferred embodiment of the complete invention.

In the drawings, Fig. 6 is a vertical sectional view taken on the line 6—6, Fig. 4; Fig. 8 is a vertical sectional detail to be referred to.

For convenience of description and facilitating the understanding of my invention, I will describe the same first in connection with that embodiment in which the connections from the chart room to the various other parts of the vessel are electrical.

Figures 1, 2:
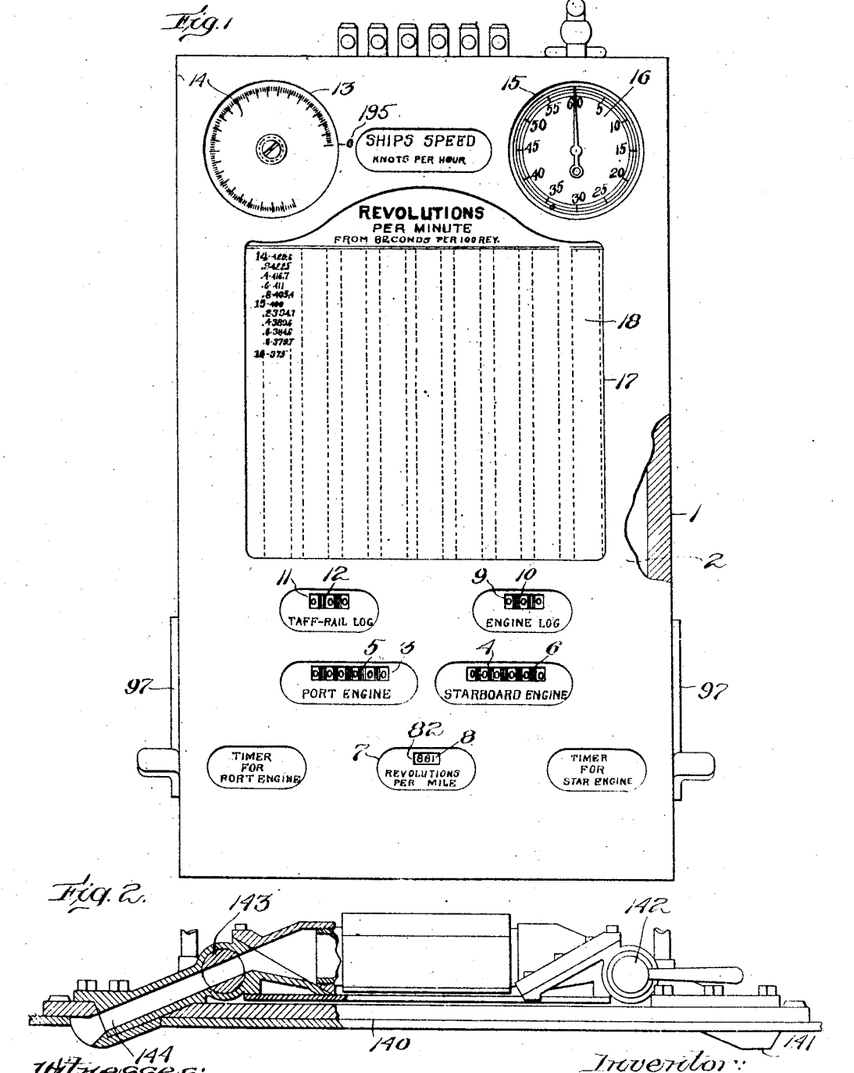
Figure 1 is a front view of the chart-room portion of the apparatus.
Fig. 2 is a sectional view of a portion of the hull of the vessel showing in plan a part of the current apparatus.
Figures 4, 5:
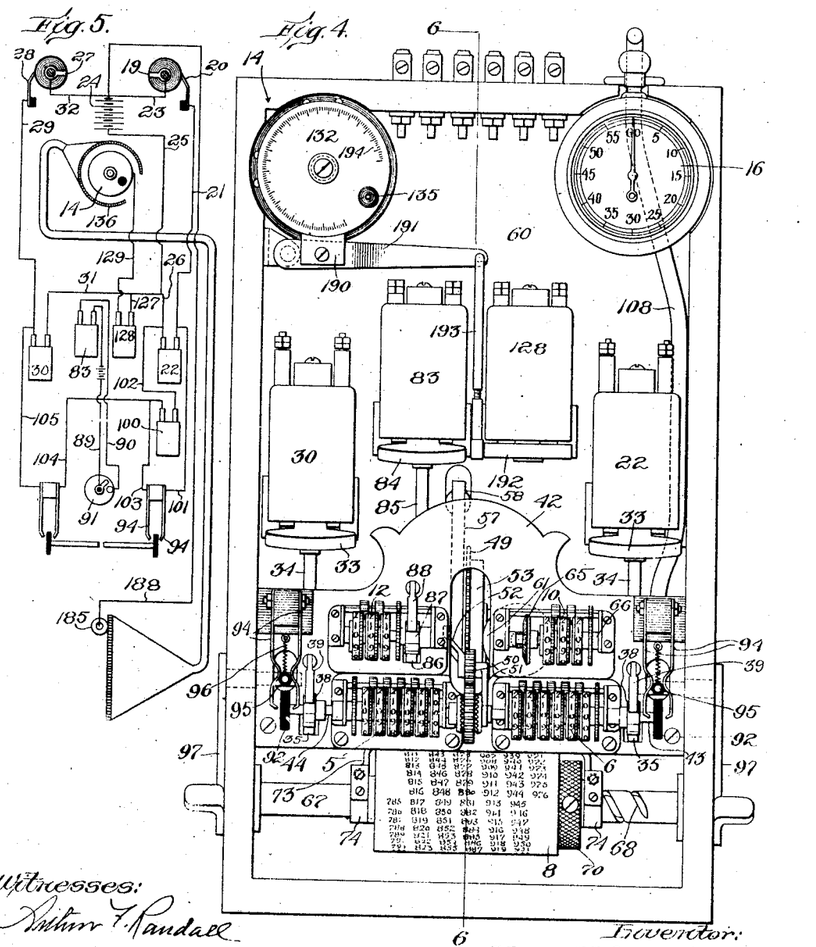
Fig. 4 is a view in front elevation of the mechanism shown in Fig. 1, with the cover removed therefrom.
Fig. 5 is a diagrammatic view for the purpose particularly of showing the wiring.

The casing 1 is provided with a cover 2 having sight openings 3, 4 for taking the readings of counters 5 and 6 respectively operated in connection with the port engine and starboard engine, a sight opening 7 for viewing a regulating device 8 (set according to the conditions of slip of screw, condition of bottom, and draft of the vessel), a sight opening 9 for viewing a counter 10 which indicates the mean number of revolutions of the two engines as indicated by the counters 5, 6, reduced to knots and modified in accordance with the position of the regulator 8, a sight opening 11 for viewing a counter 12 which indicates knots and is operated in connection with the revolutions of a taffrail log, whereby the knots indicated by the counter 10 as modified by the arbitrarily set regulator 8 may be corrected or further modified, if desired, with reference to the knot indications derived from the usual taffrail log. Also said cover 2 contains a sight opening 13 for viewing a knot-indicating device 14 (which indicates at any given moment the rate of relative speed in knots between the hull of the vessel and the adjacent water through which the vessel is moving or the current flowing past the hull of the vessel), also a sight opening 15 for viewing an indicating device 16, preferably a stop watch, for indicating the time consumed by either engine in making a given number of revolutions, and a sight opening 17 through which a table 18 may be viewed, by means of which may be ascertained the number of revolutions per minute of the engine when going at the speed indicated by the device 16 in measurements of time.

Figure 9:
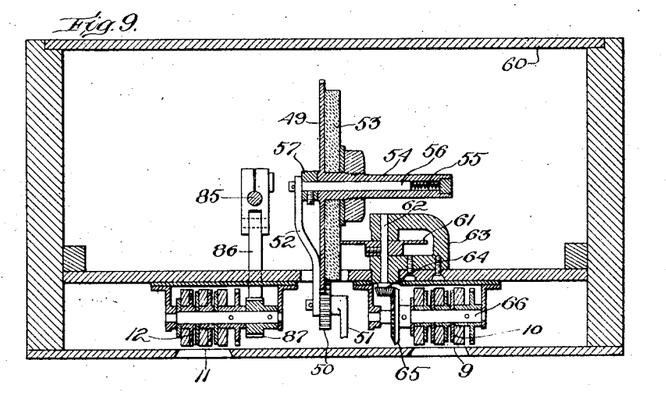
Fig. 9 is a horizontal sectional view on the line 9—9, Fig. 6.
Figures 15, 16, 17, 18:
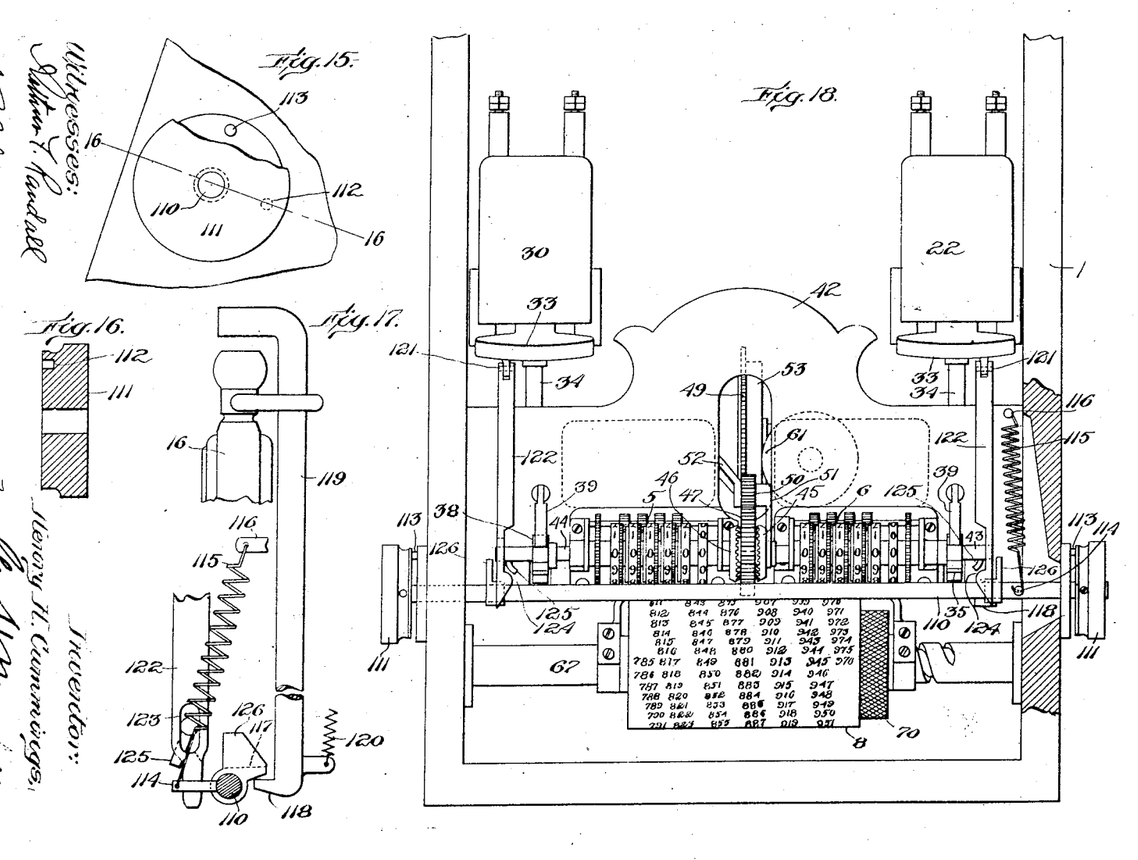
Fig. 15 is a fragmentary view in broken elevation of one side of the mechanism shown in Fig. 18.
Fig. 16 is an enlarged sectional detail on the line 16—16, Fig. 15.
Fig. 17 is a vertical sectional view of a portion of the right apparatus shown just inside of the right hand edge of the casing, Fig. 18.
Fig. 18 is a view in front elevation of a preferred form a view in front elevation of a preferred form of the lower part of the apparatus of Fig. 4.

As indicated in Fig. 5, let 19 represent a usual moving part of one of the engines, the starboard engine as herein shown, preferably the engine counter (which, in modern high-speed marine engines, especially turbines, is set to make one revolution or counting-indication to ten revolutions of the prime mover). A stationary contact 20 is provided from which a conductor 21 leads to an electromagnet 22, a conductor 23 leading from the movable contact or make-and-break device 19 to a battery or other suitable source of energy 24, whence a conductor 25 connects with a conductor 26 and thence to the electromagnet 22. A similar circuit-closing device 27 is provided for the port engine, to coöperate with a contact 28, the latter being connected by a conductor 29 to one terminal of an electromagnet 30 whose other terminal is connected by a conductor 31 to the conductor 25, a conductor 32 connecting from the contact maker 27 to the battery 24. Each of said electromagnets has an armature 33 which constitutes an actuating lever. Depending rigidly from this lever is a swinging rod 34 which carries at its lower end a pawl 35 pivoted thereto at 36, see Fig. 8, and normally held by a spring 37 in position to engage a ratchet wheel 38 held against false movement by a detent 39. The ratchet wheel which is actuated by the electromagnet 22 serves to operate the counter mechanism 6, herein shown as the counter of the starboard engine, and the ratchet wheel which is actuated by the electromagnet 30 serves to operate the counter mechanism 5, herein shown as the counter of the port engine, and as the latter may be of any usual or preferred kind, I have not shown the details thereof and deem it unnecessary to explain any further mechanism of said counter. The detent 39 prevents retrograde movement of the counter ratchet 38, and a shoulder 41 provided in a transverse plate 42, on which are mounted all the counters, coöperate with pawl 35 to prevent improper or excessive movement of the ratchet wheel 38. The two counter shafts 43, 44 of the respective counters are provided at their meeting ends respectively with beveled gears 45, 46, see Fig. 3, between which is loosely mounted on said shafts a spur gear 47 in which is radially pivoted a small epicyclic gear 48 meshing with said two gears 45, 46 and constituting one well known form of equalizer or compensating gearing. The gear 47 drives a relatively large gear 49 by means of an intermediate idler gear 50 which is journaled in the meeting ends of links 51, 52, the former mounted for convenience on the hub of the gear 45 and the latter mounted concentrically of the gear wheel 49, see Fig. 9. Clamped to the back of the gear wheel 49 is a friction disk 53, which may be made of emery or any substance affording a friction surface, the hub of said wheel 49 being extended to receive this friction disk and preferably extended beyond the same as indicated at 54 to give stability and also to constitute a sleeve for holding a spring 55 which bears against the end of a shaft 56 on which said sleeve, wheel and disk rotate and on which the link 52 is secured and which itself is fast in a lever 57 pivoted at 58, see Fig. 6, to a bracket 59 fast on the back 60 of the casing 1. The friction member 53 engages the edge of a disk or wheel 61, see Fig. 9, fast on a shaft 62 journaled in a bracket 63 to extend radially of the friction member 53 and provided at its forward end with a beveled gear 64 in mesh with a gear 65 fast on the shaft 66 of the counter 10. Thus the counter 10 is frictionally driven directly from the counter mechanisms 5, 6 in accordance with their mean rotation through the train of gears 45, 46, 47, 48, 50, 49. As, however, various factors besides the engine enter into the speed at which a vessel is driven by the screw, such as the condition of the bottom, direction of the wind, draft of the vessel, slip of the screw (due to the speed), I provide means for varying the relative speed of the counter mechanism 10 with relation to the engine speed (i. e. with relation to the counters 5, 6) in order that said counter mechanism 10 may indicate in desired units of measurement of actual distance traveled, preferably in knots. For this purpose I provide the regulating device 8, on which the numbers, as shown in Figs. 4 and 18, indicate the number of revolutions of the engines necessary under any given conditions to drive the vessel one mile (or other desired unit). Thus when, for instance, all the attendant circumstances are such that 880 revolutions of the engines are necessary to drive the vessel one mile, the device 8 is turned until 880 appears at the sight opening 7, whereupon the counter 10 will indicate miles with reference to 860 engine-revolutions for each mile.

Figures 6, 8:
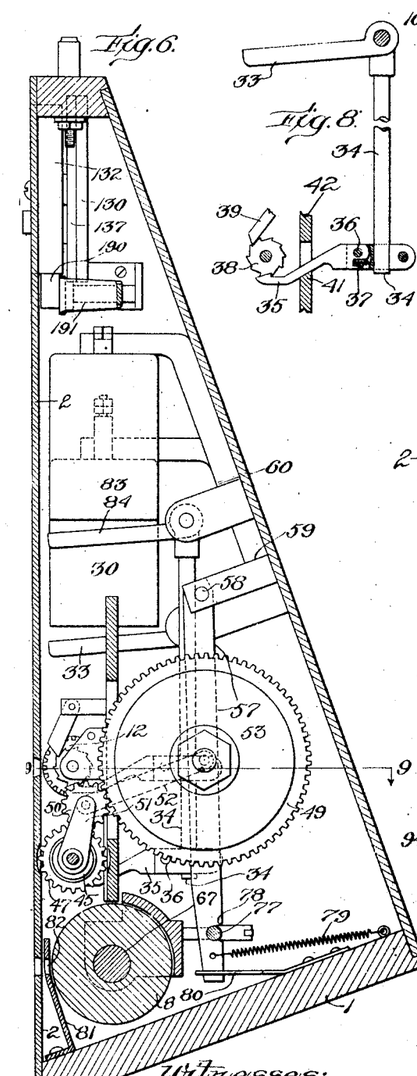
Figures 10, 11, 12, 13, 14:
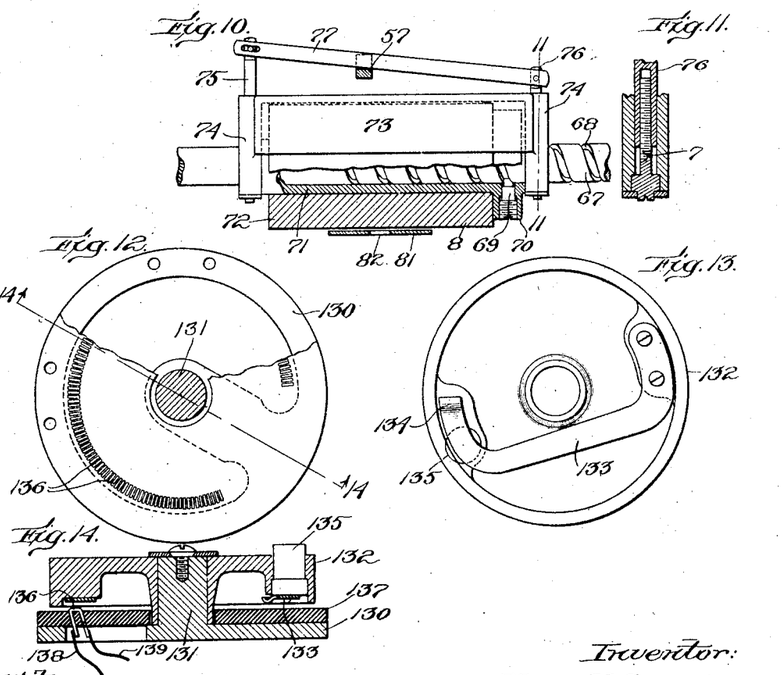
Fig. 10 is a fragmentary detail of a portion of the regulator for adjusting the apparatus to operate in accordance with given conditions, said view showing the same looking from the top downward thereon as shown in Fig. 6.
Fig. 11 is an enlarged fragmentary sectional detail taken on the line 11—11, Fig. 10, limited to showing the mounting of the arm 76.
Fig. 12 is a top plan view of Fig. 14, parts being broken away and sectioned.
Fig. 13 is an under side view of the top movable member of the mechanism shown in Fig. 14.
Fig. 14 is a vertical cross-sectional view taken on the line 14—14, Fig. 12.

While any suitable connecting mechanism between the part 8 and the counter 10 may be provided for carrying out my main object, I have shown a stationary shaft 67 provided with a spiral groove 68, best shown in Fig. 10, in which travels a stud 69 held in the knurled end 70 of a shell 71 on which, for convenience, is mounted a wooden or other covering 72 which carries the figures, best shown in Fig. 4. A yoke 73 is mounted at the rear of the mechanism just described, and has its ends 74 loosely mounted on the shaft 67 (see Fig. 6) so as to embrace the opposite ends of the shell or cylinder 71 Fig. 10 and therefore be moved longitudinally of the shaft by the lengthwise travel of said shell on said shaft. Projecting from the rear end of this yoke are arms 75, 76, the former being herein shown as longer than the latter, these arms supporting an oblique bar 77. The mounting of each arm is shown in Fig. 11, where it will be seen that the arm has threaded adjustment. The lever 57 is provided with a notch 78 adjacent its lower end which embraces the oblique rod 77, which accordingly controls the position of said lever, a spring 79 serving always to hold the lever in engagement with said rod, the lower end of the lever being preferably guided also by a slotted plate 80. Thus, whenever the member 8 is rotated and thereby caused to travel toward the right or left along the shaft 67, it operates through the oblique rod 77, acting upon the lever 57, to swing the friction disk 53 rearward or forward and thereby vary the distance from the center at which the wheel 61 engages said disk 53, which correspondingly varies the speed of rotation of the counter mechanism 10. The figures of the mechanism 8 are arranged spirally on the drum at the same pitch as the spiral groove 68 in the shaft 67, so that as the mechanism 8 is rotated it will successively bring each number in front of the sight opening 7. To turn the member 8, the door 2 is first swung open, and, in order that the mechanism 8 may be turned accurately to bring the desired figure into proper position, I provide a shield 81 having a sight opening 82 in proper relation to the sight opening 7 when the door is closed, as shown in Fig. 1. The number of the regulating mechanism 8 with reference to which the counter 10 is to be set is determined from a more or less complicated set of data, and accordingly I provide means for aiding the navigator in checking the accuracy of his work, or rather, I provide secondary means for enabling him to further modify the adjustment of the counter 10 if desired, and for this reason I provide the counter 12 actuated by an electro-magnet 83, its armature 84, rod 85, pawl 86, ratchet wheel 87, and detent 88, all exactly the same as shown in Fig. 8, said electromagnet 83 being connected by conductors 89, 90, see Fig. 5, to a usual taffrail-log mechanism 91, which therefore operates the counter 12 in accordance with the movements of the taffrail log responsive to the actual travel of the vessel. As this travel or rate of movement of the vessel through the water varies hourly, as consumption of fuel causes the draft to vary, and as the wind varies and other circumstances may vary, the navigator is enabled, by means of the counter 12, to determine instantly whether the mechanism 8 has probably been set correctly to vary the counter 10, inasmuch as the counters 10 and 12 should indicate the same. For example, if a heavy head wind should suddenly be met with, the taffrail-log counter 12 would immediately slack up because the travel of the vessel would be checked, but the engine-log counter 10 would keep on at the same speed as before, because the rotations of the engine would remain the same as before.

Figure 3:
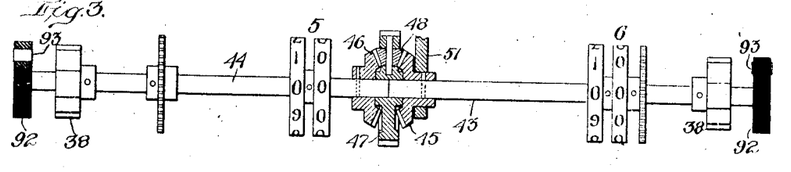
Fig. 3 is a view in plan, parts being broken away, showing a portion of the mechanism contained in the apparatus of Fig. 1.
Figure 7:
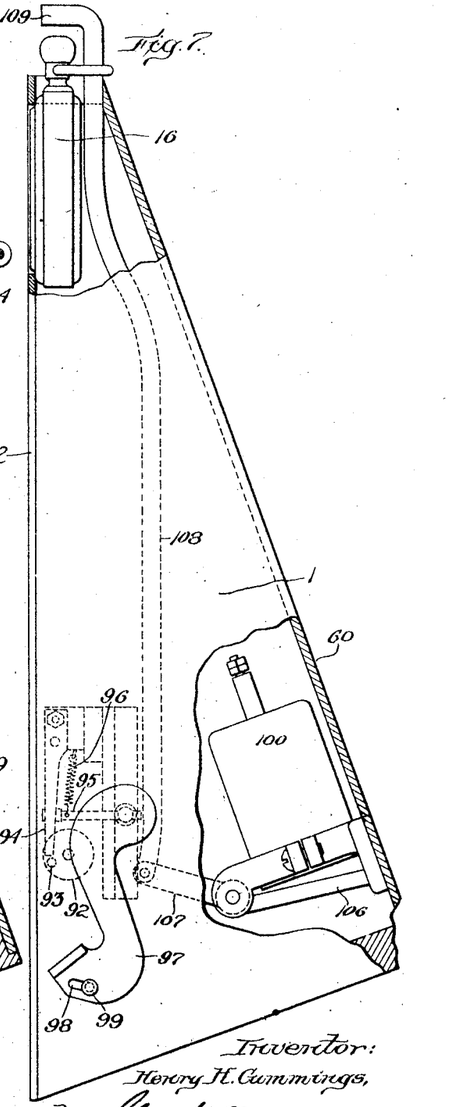
Fig. 7 is a broken side elevation of the mechanism shown in Fig. 1.

As shown in Figs. 3 and 4, the shafts 43 and 44 are provided at their outer ends with make and break wheels or rotary contacts 92, the left hand one of which is shown broken out in Fig. 3 to indicate the metal plug 93 which constitutes the contact maker thereof. Coöperating with these rotary contact makers are contact springs 94 normally under tendency to maintain contact with the wheel 92, adapted to be separated by a lever 95, see Fig. 7, normally held in inoperative position by a spring 96 but adapted to be swung by a lever 97. A slot 98 and pin 99 preferably serve to limit the movement of the lever 97 from inoperative to operative position. These opposite pairs of contacts 94 coöperate with the contact pins 93 to energize an electromagnet 100, see Figs. 5 and 7, being connected in any suitable manner, as by conductors 101, 102, 103, 104, and 105 to said electromagnet and in circuit with the respective engines so that, whenever the starboard engine, for instance, operates its starboard counter 6 through electromagnet 22, the electromagnet 100 will be operated thereby at the proper time, and whenever the port engine operates its counter 5 through its electromagnet 30, the electromagnet 100 will be operated at the proper time in connection with the port engine. Preferably the parts will be proportioned to close the circuit through the contact springs 94 once in ten impulses of the counters 5 or 6, as the case may be, i. e. once in one hundred revolutions of the engine.

The electromagnet 100 serves to actuate the armature 106 whose lever 107 is pivotally connected to a rod actuator 108 whose upper end 109, when actuated, suddenly strikes upon the stem of the stop watch 16 and thereby starts said watch, which continues to run until stopped by a succeeding blow from the end 109 of said actuator. This accordingly measures the duration required for one hundred revolutions of the engine. Knowing this length of time, the navigator turns to the table 18, which indicates to him the number of revolutions per minute when going at the speed determined with the aid of the stop watch. For instance, if the stop watch records thirty seconds for one hundred revolutions, the chart indicates that the engine is going at the rate of two hundred revolutions per minute. This enables the navigator to know at any time the exact speed of either of the engines, and enables him to receive this information without waiting an entire minute and without other delay or danger of error. The stop watch actuator 108 will continue to operate at intervals of one hundred revolutions of the engine as long as the operator holds down upon the lever 97, but the moment he releases said lever, the contacts 94 will thereafter be held separated so that the actuator 108 cannot operate. While for some reasons it is desirable to have all the apparatus electrically controlled, I prefer to employ a manually operated stop watch control, the details of which are shown in Figs. 15–18, where it will be seen that adjacent the counters 5 and 6 I provide a longitudinally shiftable rock shaft 110 provided on its opposite ends with momentum wheels 111 which have recesses 112 adjacent their peripheries on their inner sides adapted to coöperate with stationary locking pins 113. The rock shaft 110 is provided on its front side with a projecting arm or lever 114 engaged by one end of a spring 115 whose other end is secured at 116 to a stationary part. A shoulder or lever 117 is fast on the rock shaft 110 in position to engage the hooked end 118 of a rod 119 normally held under upward tendency by a spring 120, said rod corresponding to the rod 108 for actuating the stop watch 16. Pivoted at 121 to the armature 33 of the electromagnet 22 is a tripping rod 122 provided with a slot 123 adjacent its lower end to straddle the adjacent counter shaft, see Fig. 17, said rod 122 having its lower end provided with a rounded or wedge-shaped surface or bunch 124 Fig. 18 to coöperate with a cam pin 125 on the counter shaft when the armature 33 is raised, said cam pin and surface 124 causing the lower end of the tripping rod 122 to swing forcibly outward against a wall or wing 126 which projects from the rock shaft 110 in the path thereof whenever the operator has turned said rock shaft so as to engage the pin 113 with the recess 112.

When the operator has turned the momentum wheel 111 to interlocked position with relation to the pin 113, the arm or lever 114 is thereby turned from its full-line position, Fig. 17, which places the spring 115 under tension so that when the tripping rod 122 is shifted outwardly by the cam pin 125 and thereby shifts the rock shaft 110 sufficiently to disengage the momentum wheel from the pin 113, said spring exerts considerable rotative force on said rock shaft, said force increasing as the effective leverage thereof through the arm 114 on said shaft becomes greater, with the result that when the shoulder 117 strikes the hooked end 118 of the stop-watch actuator, the latter is forcibly actuated, the rotative force of the rock shaft being supplemented by the force of the momentum wheels, so that the stop watch is sure to be operated. It is to be understood that these momentum wheels are relatively massive, and being set in motion by the action of the spring their mass is such that they continue to move long enough to insure the operation of the stop watch.

Having determined the number of revolutions of the engine necessary to drive the vessel at the desired speed and set the apparatus in accordance therewith, it becomes necessary to enable the navigator to know at any instant whether he is at that instant going at that speed or not, and accordingly I provide the speed-indicating device 14, which enables the navigator to tell at any moment the exact speed of the vessel through the water per hour, so that he may thereby check immediately such errors as may thereby be revealed at the indicator 10. The speed indicator 14 must necessarily operate in connection with the water current, and preferably it operates in connection with the flow of water past the vessel directly at the hull (preferably forward, although not shown).

Figure 21:
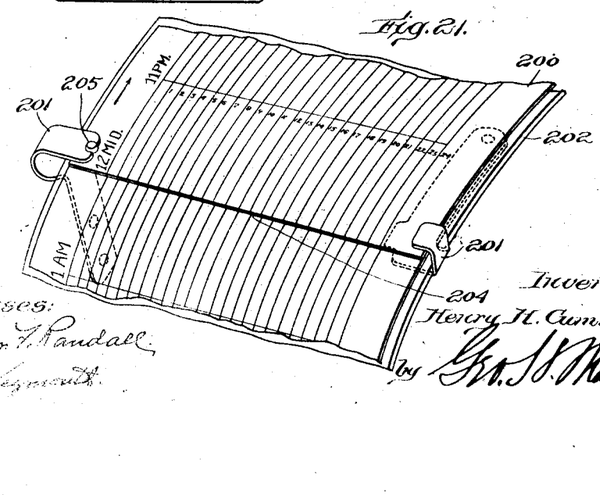
Fig. 21 is a perspective view of a portion of the recording drum.
Figures 22, 23, 24, 25:
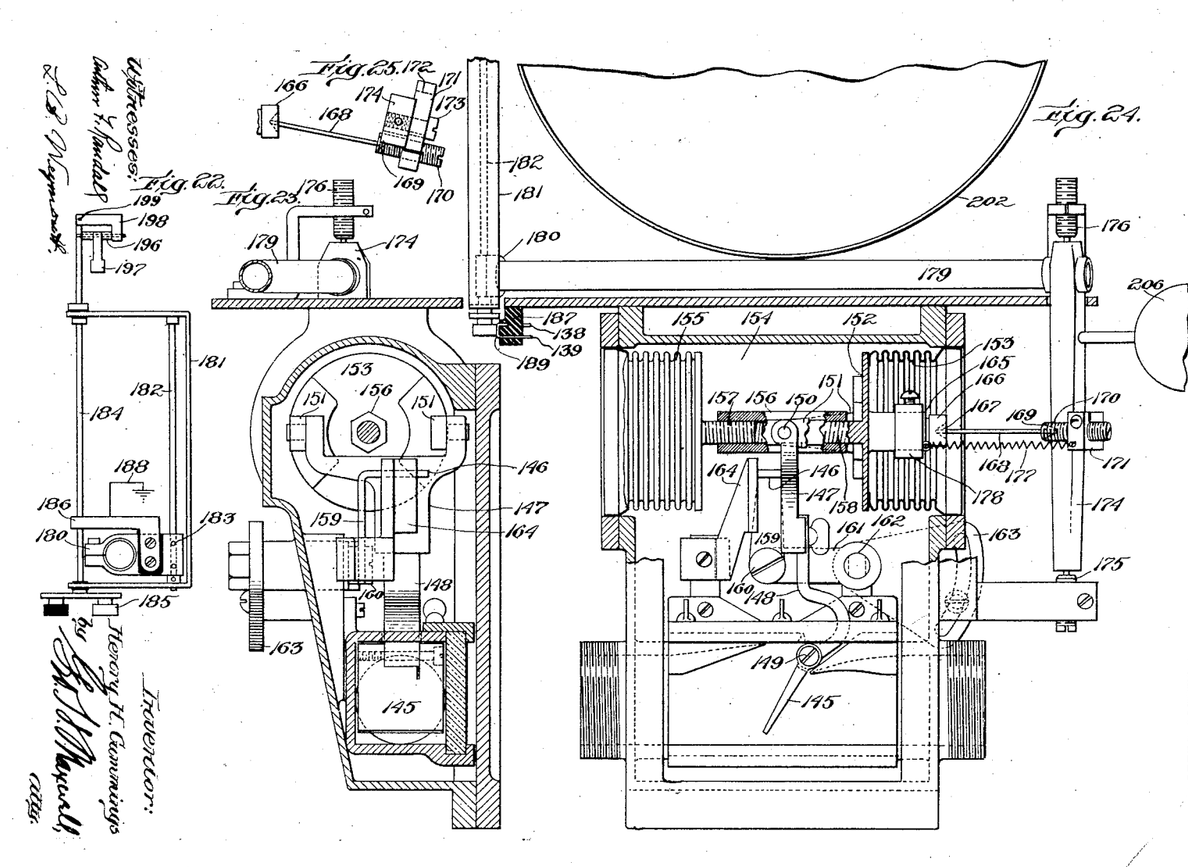
Fig. 22 is a view in side elevation of a detail of the mechanism shown in Fig. 19, viewed from the left.
Fig. 23 is a central vertical sectional view of the mechanism shown in Fig. 24, looking toward the right.
Fig. 24 is a view in side elevation, partly in section, of the current-speed determining mechanism.
Fig. 25 is a top plan view of a detail at the extreme right hand end of the mechanism shown in Fig. 24.

As herein shown, a conductor 127 leads from one side of the battery, as from the wire 26, to an electromagnet 128, from which a conductor 129 leads to the base 130 of the speed indicator 14, said base being provided with a central post 131 on which is mounted to rotate a rotary contact-maker 132 provided on its under side with a spring contact 133 whose end 134 is depressed by an externally projecting push button 135 to engage with a series of contacts or wire terminals 136 which extend concentrically around the post 131, being supported in a plate 137 of insulation, as best shown in Fig. 14. These contacts 136 are U-shaped, one leg of the U being longer than the other, as clearly shown in said Fig. 14, and are set alternately so that the long leg of one contact is toward the outside and the long leg of the next contact is toward the inside, thereby making it possible to provide for a large number of wires in the necessarily small space. Two of these wires are indicated at 138, 139. A wire leads from each contact 136 to the hull of the vessel where the current speed is being taken; see Figs. 2, 19-25. The hull 140 is provided with an inlet passage 141 communicating through sea cocks 142, 143 with an outlet passage 144, and between said cocks is the current log or current-controlled mechanism for actuating the speed indicator 14, as best shown in Figs. 23 and 24, where it will be seen that in the current passage depends a paddle-like end 145 of a lever having an adjustable fulcrum 146, said lever having two parts 147, 148, above the paddle-like end, whose angular position is controlled by a bolt 149. The lever is pivoted at 150 to studs or brackets 151 projecting from the head 152 of a spring device, herein shown as a metal bellows 153, which, while permitting free in-and-out movement, serves to close the chamber 154 air and water tight. To equalize or balance the pressure and give free, easy movement, I provide a similar bellows 155 in opposition to the bellows 153, connected therewith by a right and left threaded nut or turnbuckle 156 engaging threaded studs 157, 158 on said bellows respectively. The fulcrum 146 is in the form of an outturned end of an arm 159, pivoted at 160 to a lever 161 on a shaft 162 which projects through the casing of the chamber and is provided on its inner end with an adjusting sector 163. The fulcrum end 146 bears against a stationary back support 164. Within the bellows 153 I mount a post 165 in which is tapped a stud 166 having a conical seat 167 at its outer end which loosely sustains a rod 168 whose opposite end is supported in a similar conical recess 169 in a stud 170 threaded into a block 171. The block 171 is provided with a slot 172 and adjustably held by a screw 173 in one side of a rectangular post or vertical rock shaft 174 which is pivoted at its opposite ends at 175, 176. The studs 166 and 170 are held toward each other in supporting relation to the rod 168 by a spring 177 attached at one end to an adjustable collar 178 and at the other end to the block 171.

By having the adjustments 165 and 170 for the rod 168, I am enabled to bring the bearing point 169 at such a point with relation to the axis of the rock shaft 174 that the line of thrust of said rod will be in a direction nearer the pivot of the rock shaft at the beginning of its movement to the right, Fig. 24, than later in said movement. This compensates for the variation of pressure of the water current with change of velocity, so that when the current is slow and hence has little movement and therefore the pendent member 145 has little movement, said little movement will exert a comparatively large movement of the rock shaft 174, the point 169 being then in the position shown in Fig. 25 with relation to the pivot or axis thereof, whereas when the current is rapid and hence has greatly increased pressure, so that the member 145 has greater movement, the thrust of the rod 168 is then in a direction at the greatest distance from the axis 174 so that the point 169 has less movement. At its upper end, the rock shaft 174 carries an arm 179 to which is clamped at 180 a bracket which carries a frame 181 pivotally supported on a pivot rod 182 fast on said bracket at 183 and provided at its outer side with a rod 184 supporting at its lower end a contact roll or wheel 185, a contact spring 186 serving the double purpose of a conductor and to keep the rolls in engagement with a contact bar 187. A conductor 188 leads from the spring 186 to ground, being thus conventionally shown in Fig. 22. The contact bar 187 is provided with a series of contacts 189 the same as the contacts 136, one for each wire from the latter. Thus, as the current moves the member 145, the mechanism from the latter swings the roller contact 185 over the stationary contacts 189, thereby electrically connecting this portion of the apparatus with the row of contacts 136 of the speed indicator 14 in the casing 1.

An electrically operated stop device for the hand rotatable top plate or dial plate 132 of the speed indicator is provided, operating to bring the dial plate 132 to a positive stop the moment that its contact end 134 has engaged the terminal 136 of the same wire that is, at that moment, engaged by the contact roll 185 at that portion of the current mechanism adjacent the hull. The automatic stop mechanism herein shown consists of a brake shoe 190 carried by a brake lever 191 actuated by the armature 192 of the electromagnet 128 which is adjustably connected thereto by a link 193. Thus whenever the operator, by pushing inwardly and laterally on the handle or push button 135, turns the dial plate 132 around until it reaches circuit closing position, it is thereupon instantly stopped by the brake mechanism exactly in that position. The operator then reads the figure of the scale 194 which is opposite the index mark or finger 195, thereby ascertaining the exact current speed or speed of the vessel, in terms of distance per hour, at the given instant. The movement of the current log contact 185 makes a permanent record also. At its upper end the rod 184 which carries said contact is provided with a laterally extending arm 196 on which is loosely swung a recording pen, herein shown as an Elliot siphon pen 197, held in place by a detent 198 pivoted at 199 to the top of the post or rod 184. This pen makes its record on chart paper 200 secured by clamps 201 to a drum 202 driven in well known manner by clock mechanism 203. This drum is twice the size of the usual drum, so as to hold two sheets of chart paper, or, stated more properly, so as to effect a record of twenty four hours in each half revolution of the drum. The object of this feature of the invention is to enable the apparatus to keep up its movement continuously, as the operator can remove a completed sheet whenever desired during the twenty four hours. This is particularly important because the record has to begin and end at midnight, and hence, by having two sheets placed end to end on the drum, said sheets begin their record at midnight at the end or starting line 204 and end their record at midnight at the edge of its opposite end, see Fig. 21. Positioning pins 205 are preferably provided for insuring the accurate positioning of the two chart sheets on the drum 202. Also, in view of the movements of the ship, I provide a counterbalance 206 to counterbalance the arm 179 and parts carried thereby, so as to offset any modifying influence which they would otherwise have on the sensitiveness of the current-impulse-receiving device 145.

In practice, the navigator, especially if a naval man, has usually his own way of determining the various factors which modify the speed of his vessel. For the purpose, however, of rendering my invention clear and setting forth its various capabilities of use, it may be briefly stated that the navigator may find his slip of screw from the rotations of the engines as revealed by the stop watch mechanism 16 with reference to the table 18. Thus, knowing the number of rotations of the engines, and therefrom the slip of the screw, and from this the theoretical speed of the vessel, he then ascertains by means of the current-speed indicator 14 the actual speed of the vessel, and this, by comparison with said theoretical speed of the vessel, gives him the combined influence of the other factors which are modifying the speed of the vessel (head wind or back wind, condition of the bottom, etc.) From this information, he turns the regulator 8 to that figure which indicates the number of mean revolutions of the two engines requisite to drive the vessel at the desired speed, thereby shifting the friction disk 53 to the theoretically required position with relation to the counter driving wheel 61 of the counter 10. If now the counter 10 is observed to operate at substantially the same speed as the taffrail log counter 12, the navigator may know that his calculations are correct. But if there is a substantial difference between said two counters 10 and 12, then it becomes evident that there is an error or misadjustment somewhere. On the other hand, the counter 5 exhibits at all times the number of revolutions which have taken place in the port engine, and the counter 6 exhibits the number of revolutions which have taken place in the starboard engine. By shifting the momentum-wheel-carrying rod 110 of my preferred construction to the right, Fig. 18, the speed of the port engine may be ascertained at any moment by means of the stop watch 14 and the table 18, and by shifting said rod to the left, the speed of the starboard engine may similarly be ascertained at any moment. And the same results may be obtained by the electrical connections in the modified construction. So, by means of the speed indicator 14, the operator can at any moment ascertain the rate of travel of the vessel, and by means of the counter 12 he can ascertain the total number of knots or miles of the vessel's travel.

Figures 19, 20:
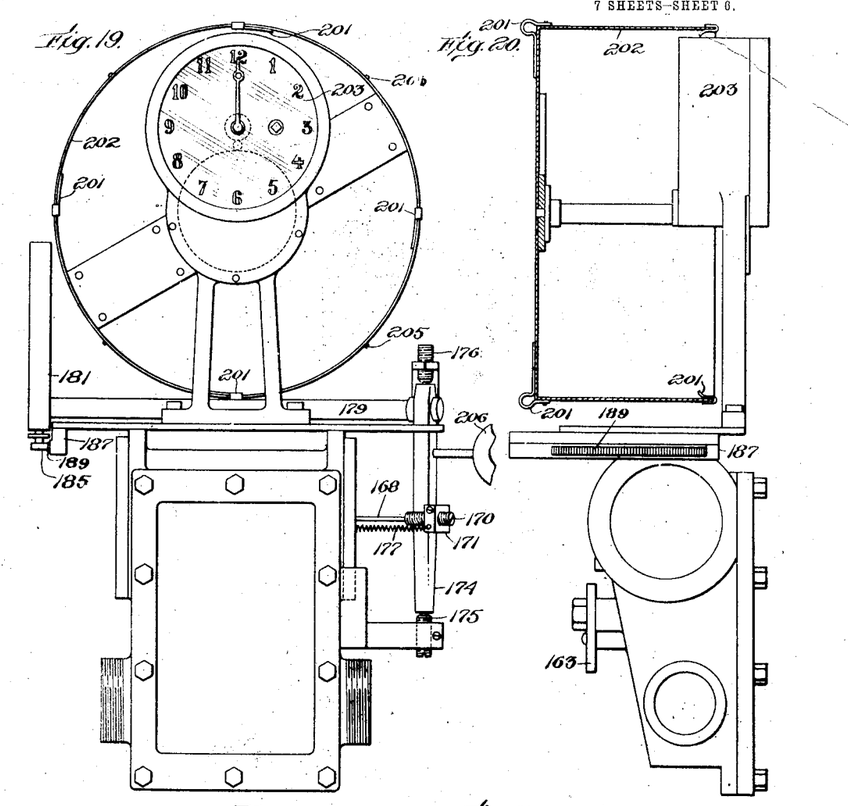
Fig. 19 is a view in front elevation of a portion of the current apparatus, part of which is shown in Fig. 2.
Fig. 20 is a view of the mechanism shown in Fig. 19, looking at the left side thereof, partly in section.

One reason for preferring the momentum apparatus or means for mechanically operating the stop watch from the engine counter shaft is that it obviates the necessity of having a powerful battery or electromagnets, and enables me, therefore to reduce the size and expense of the electrically operated mechanism for this purpose. The action of the spring 115, in giving an initial and relatively high speed to the wheels 111, is supplemented by the momentum of the latter sufficiently to operate with certainty the stop watch, and, this movement having taken place, the rod 110 is then left in inoperative position, requiring the operator to restore it to interlocked positon on the pin 113, so that at the completion of a full rotation of the counter shaft, the watch will be stopped, and will remain stopped unless the operator purposely repeats the operation. I regard this provision of means compelling the attention of the operator to this part of the apparatus when obtaining the record as of practical importance. I also regard as of considerable practical importance the provision of the speed indicator 14 capable of indicating at any desired instant the actual speed of the vessel through the water, unmodified by the rolling and pitching movements of the vessel. The indicator wheel 132 indicates with certainty the exact current speed at the instant that the navigator turns it, and it remains in that position until manually operated again, whereas the recording mechanism, Figs. 19-21, gives a permanent record of all the fluctuations of speed, or in other words, my mechanism provides for the separation of the two elements which are individually and separately important to the navigator, viz. the record of all the different speeds of the vessel, and the definite ascertainment of the speed at any one moment desired. Also, by having the record made mechanically and having it made directly at the point of influence of the current (by which I mean directly at the point where the current acts on the recording levers), I largely eliminate the possibility of errors which would be caused by attempting to convey this record mechanically from the prime actuator in the hull below the water line up to the chart room, and yet, on the other hand, I provide at the remote point, i. e. in the chart room, means whereby the navigator may know instantly the actual speed at that instant, and also the record which is being made on the chart at that instant.

As already intimated, I have not undertaken herein to show more than a preferred embodiment of the invention, and it will be understood that the latter is capable of a wide range of variations in constructional details, arrangement, and combination of parts within the spirit and scope of my invention as hereinafter defined in the broader of the claims.

Having described my invention, what I claim as new and desire to secure by Letters Patent is:

1. In an apparatus of the kind described, indicating means to indicate the theoretical travel of the ship through the water, means to vary at will the action of said indicating means, and operating mechanism, including separate counters, one for each engine, for operating said indicating means in response to the mean revolutions of said ship's engines, said counters indicating at the same time the actual separate revolutions of the respective engines.

2. In an apparatus of the kind described, indicating means to indicate the theoretical travel of the ship through the water, means to vary at will the action of said indicating means, operating mechanism, including separate counters, one for each engine, for operating said indicating means in response to the mean revolutions of said ship's engines, said counters indicating at the same time the actual separate revolutions of the respective engines, a stop-watch mechanism, and independent mechanism under the control of the navigator responsive respectively to said counters for operating the stop mechanism to indicate the time required for a given number of revolutions of the particular engine.

3. In an apparatus of the kind described, the combination with automatic mechanism under the control of the operator for indicating the actual speed of a ship's engine, including counters connected for control by the engine, and means for automatically stopping said counters at the end of the time measurement of a given number of revolutions, of indicating means for reducing the engine speed to theoretical ship's speed, and means for regulating said indications according to actual conditions, said counters, indicating means and regulating means being arranged in juxtaposition and assembled relation for comparison and simultaneous reading by a single observer.

4. In an apparatus of the kind described, the combination with operative connections from a ship's engine, of automatic mechanism in operative relation to said connections under the control of the operator to indicate the length of time required for a given number of revolutions of the engine, including a momentum device, and a spring for actuating said momentum device, for operating said mechanism.

5. In an apparatus of the kind described, the combination with operative connections from a ship's engine, of automatic mechanism in operative relation to said connections under the control of the operator to indicate the length of time required for a given number of revolutions of the engine, including a stop-watch mechanism, and a rotary device for controlling said stop-watch mechanism.

6. In an apparatus of the kind described, the combination with operative connections from a ship's engine, of automatic mechanism under the control of the operator to indicate the length of time required for a given number of revolutions of the engine, including a stop-watch mechanism, a rotary momentum device, a spring normally tending to move said momentum device in one direction, means for holding said momentum device in opposition to said spring, tripping means for releasing said momentum device upon the occurrence of a predetermined number of revolutions of the engine, and connecting means from said stop-watch mechanism to said momentum device actuated by the latter when thus released.

7. In an apparatus of the kind described, the combination with operative connections from a ship's engines, of automatic mechanism under the control of the operator to indicate the length of time required for a given number of revolutions of the engine, including a rock shaft, a momentum wheel carried by said shaft, a stop-watch mechanism responsive to the movement of said momentum wheel, means to operate said shaft and momentum wheel in a direction to actuate said stop-watch mechanism, means to lock said momentum wheel against said movement, and automatic tripping means to unlock said momentum wheel at the end of said given number of revolutions of the engine.

8. In an apparatus of the kind described, the combination with operative connections from a ship's engines, of automatic mechanism under the control of the operator to indicate the length of time required for a given number of revolutions of the engine, including a counter mechanism, provided with a pawl and ratchet actuator, an electro-magnet and its armature responsive to the engine movements for operating said pawl and ratchet actuator in accordance with said engine movements, a rock shaft, a momentum wheel carried by said rock shaft, a stop-watch mechanism, a connection from said stop-watch mechanism to be operated by said shaft and momentum wheel, means to operate said shaft and momentum wheel in a direction to actuate said connection, means to lock said momentum wheel against said movement, and automatic tripping means actuated by said counter mechanism to unlock said momentum wheel at the end of said given number of revolutions of the engine.

9. In an apparatus of the kind described, the combination with operative connections from a ship's engines, of automatic mechanism under the control of the operator to indicate the length of time required for a given number of revolutions of the engine, including a counter mechanism, provided with a pawl and ratchet actuator, an electro-magnet and its armature responsive to the engine movements for operating said pawl and ratchet actuator in accordance with said engine movements, a rock shaft, a momentum wheel carried by said rock shaft, a stop-watch mechanism, a connection from said stop-watch mechanism to be operated by said shaft and momentum wheel, a spring to operate said shaft and momentum wheel in a direction to actuate said connection, means to lock said momentum wheel against said movement, and automatic tripping means actuated by said counter mechanism to unlock said momentum wheel at the end of said given number of revolutions of the engine.

10. In an apparatus of the kind described, the combination with operative connections from a ship's engines, of automatic mechanism under the control of the operator to indicate the length of time required for a given number of revolutions of the engine, including a counter mechanism, provided with a pawl and ratchet actuator, an electro-magnet and its armature responsive to the engine movements for operating said pawl and ratchet actuator in accordance with said engine movements, a rock shaft, a momentum wheel carried by said rock shaft, a stop-watch mechanism, a connection from said stop-watch mechanism to be operated by said shaft and momentum wheel, means to operate said shaft and momentum wheel in a direction to actuate said connection, means to lock said momentum wheel against said movement, and automatic tripping mechanism movable with said armature and actuated by said counter mechanism at a predetermined point in the movement of the latter to unlock said momentum wheel and thereby permit the operation of said connection from the stop-watch mechanism.

11. In an apparatus of the kind described, the combination with operative connections from a ship's engine, of automatic mechanism to indicate the length of time required for a given number of revolutions of said engine, including a longitudinally movable rock shaft, a momentum wheel carried by said shaft, a stop-watch mechanism responsive to the movement of said momentum wheel, means to operate said shaft and momentum wheel in a direction to actuate said stop-watch mechanism, means to lock said momentum wheel against said movement, and automatic tripping means to shift said shaft longitudinally for unlocking said momentum wheel.

12. In an apparatus of the kind described, the combination with operative connections from two of the ship's engines, of automatic mechanism to indicate the length of time required for a given number of revolutions of either of said two engines, including a longitudinally movable rock shaft, a momentum wheel carried by said shaft, a stop-watch mechanism responsive to the movements of said momentum wheel, means to operate said shaft and momentum wheel in a direction to actuate said stop-watch mechanism, means to lock said momentum wheel against said movement when said shaft is in one longitudinal position, a second means to lock said momentum wheel against said movement when said shaft is in another position, and automatic tripping mechanisms responsive respectively to said engines, one for shifting said shaft from one of said positions at the end of a given number of revolutions of its engine, and the other for shifting said shaft from its other position at the end of a given number of revolutions of said other engine.

13. In an apparatus of the kind described, the combination with operative connections from a ship's engine, of means responsive to its revolutions for indicating the theoretical travel of the ship in terms of distance, means to indicate the actual travel of the ship, and regulating means to vary the ratio of movement of said indicating means with reference to the revolutions of the engine, including a rotary actuator for said indicating means, a swinging friction disk bearing sidewise against the edge of said actuator, and manually operated adjusting means for swinging said disk radially with relation to the edge of said actuator.

14. In an apparatus of the kind described, the combination with operative connections from a ship's engine, of means responsive to its revolutions for indicating the theoretical travel of the ship in terms of distance, means to indicate the actual travel of the ship, and regulating means to vary the ratio of movement of said indicating means with reference to the revolutions of the engine, including a step-by-step mechanism, operating means therefor responsive to a moving part of the engine, a rotary actuator for said indicating means, a friction disk having sidewise driving engagement with the edge of said actuator, a swinging support to swing said disk transversely of said actuator for moving the point of engagement of the latter toward and from the center of said disk, and driving means for driving said disk from said step-by-step mechanism.

15. In an apparatus of the kind described, the combination with operative connections from a ship's engine, of means responsive to its revolutions for indicating the travel of the ship in terms of distance, and regulating means to vary the ratio of movement of said indicating means with reference to the revolutions of the engine, including a rotary drum provided with indicating numbers spirally arranged on its surface, coöperating means for moving said drum longitudinally when rotated, and speed-varying driving mechanism for said indicating means controlled in accordance with the position of said drum.

16. In an apparatus of the kind described, the combination with operative connections from a ship's engine, of means responsive to its revolutions for indicating the travel of the ship in terms of distance, and regulating means to vary the ratio of movement of said indicating means with reference to the revolutions of the engine, including a rotary drum provided with indicating numbers spirally arranged on its surface, coöperating means for moving said drum longitudinally when rotated, speed-varying driving mechanism for said indicating means controlled in accordance with the position of said drum, and a stationary shield having a sight opening in position to permit one only of said numbers to be seen at a time.

17. In an apparatus of the kind described, the combination with operative connections from a ship's engine, of means responsive to its revolutions for indicating the travel of the ship in terms of distance, and regulating means to vary the ratio of movement of said indicating means with reference to the revolutions of the engine, including a swinging driving mechanism for said indicating means whose position varies the speed of said indicating means, and a controlling device movable transversely of the plane of the swinging movement of said driving mechanism, said controlling device having a positioning member extending obliquely to the direction of its movement, loosely engaging a part of said driving mechanism, whereby the transverse movement of said controlling device operates through said oblique member to swing said driving mechanism with relation to said indicating means.

18. In an apparatus of the kind described, the combination with operative connections from two of the ship's engines, of a counter mechanism for each engine to indicate the revolutions of the respective engines, electrical connections from said engines to said counter mechanisms respectively, including make-and-break impulse-giving mechanism actuated by a moving part of the engine, a third counter mechanism for indicating the theoretical distance traveled, and means for conveying to the latter the mean impulses of the two engine counters.

In testimony whereof, I have signed my name to this specification, in the presence of two subscribing witnesses.

HENRY H. CUMMINGS.

Witnesses:
M. J. SPALDING,
W. J. PIKE.